United States Patent
Dixon et al.

(10) Patent No.: US 7,245,480 B2
(45) Date of Patent: Jul. 17, 2007

(54) ELECTRICAL COMPONENT SIDE ACTION FASTENERS FOR A LOAD CENTER BASEPAN

(75) Inventors: Joseph Scott Dixon, Suwanee, GA (US); Kristopher Scott Robinson, Atlanta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/998,684

(22) Filed: Nov. 29, 2004

(65) Prior Publication Data

US 2006/0114648 A1    Jun. 1, 2006

(51) Int. Cl.
*G06F 1/16* (2006.01)
(52) U.S. Cl. .................. 361/634; 361/637; 361/645; 200/293; 200/294
(58) Field of Classification Search ............... 361/608, 361/611, 118, 622, 624, 627, 636–638, 641, 361/644, 648, 652, 668, 669, 673, 822–824, 361/825–827; 439/252, 372, 460, 532, 574, 439/575, 709, 716, 517–518, 797; 200/293, 200/294, 296; 174/52.1, 99 B, 70 B, 71 B, 174/72 B, 65 R, 88 B, 149 B, 166 R
See application file for complete search history.

(56) References Cited

U.S. PATENT DOCUMENTS 3,769,553 A * 10/1973 Coley ..................... 361/634
4,118,754 A * 10/1978 Duggan ................... 361/637
5,181,165 A *  1/1993 Gehrs et al. .............. 361/637
5,337,211 A *  8/1994 Reiner et al. ............. 361/637
5,640,294 A     6/1997 Caggiano et al. ......... 361/637
6,160,698 A    12/2000 Tumlin et al. ............ 361/627
6,266,232 B1 *  7/2001 Rose et al. ............... 361/645
6,813,142 B1 * 11/2004 Seff ....................... 361/637

* cited by examiner

*Primary Examiner*—Michael Datskovskiy
(74) *Attorney, Agent, or Firm*—Rashmi Raj

(57) ABSTRACT

An apparatus and method for a load center comprising a basepan with a plurality of fastener devices for securing bus bars, neutral bars, and a variety of other electrical components to the basepan. Each fastener device comprises a self aligning support post and an arm with engaging lock affixed thereto. The self aligning support post projects away from the basepan first surface. The self aligning support post consists of a plurality of angled surfaces to facilitate assembly of the electrical component to the first surface of the basepan. The engaging lock has a first surface with an inclined angle with respect to the basepan and a second surface angled at zero degrees with respect to the basepan to facilitate securing the electrical component to basepan first surface. The fastening device may also include a swing snap and an angled arm for securing electrical components to basepan first surface.

28 Claims, 5 Drawing Sheets

SECTION A-A

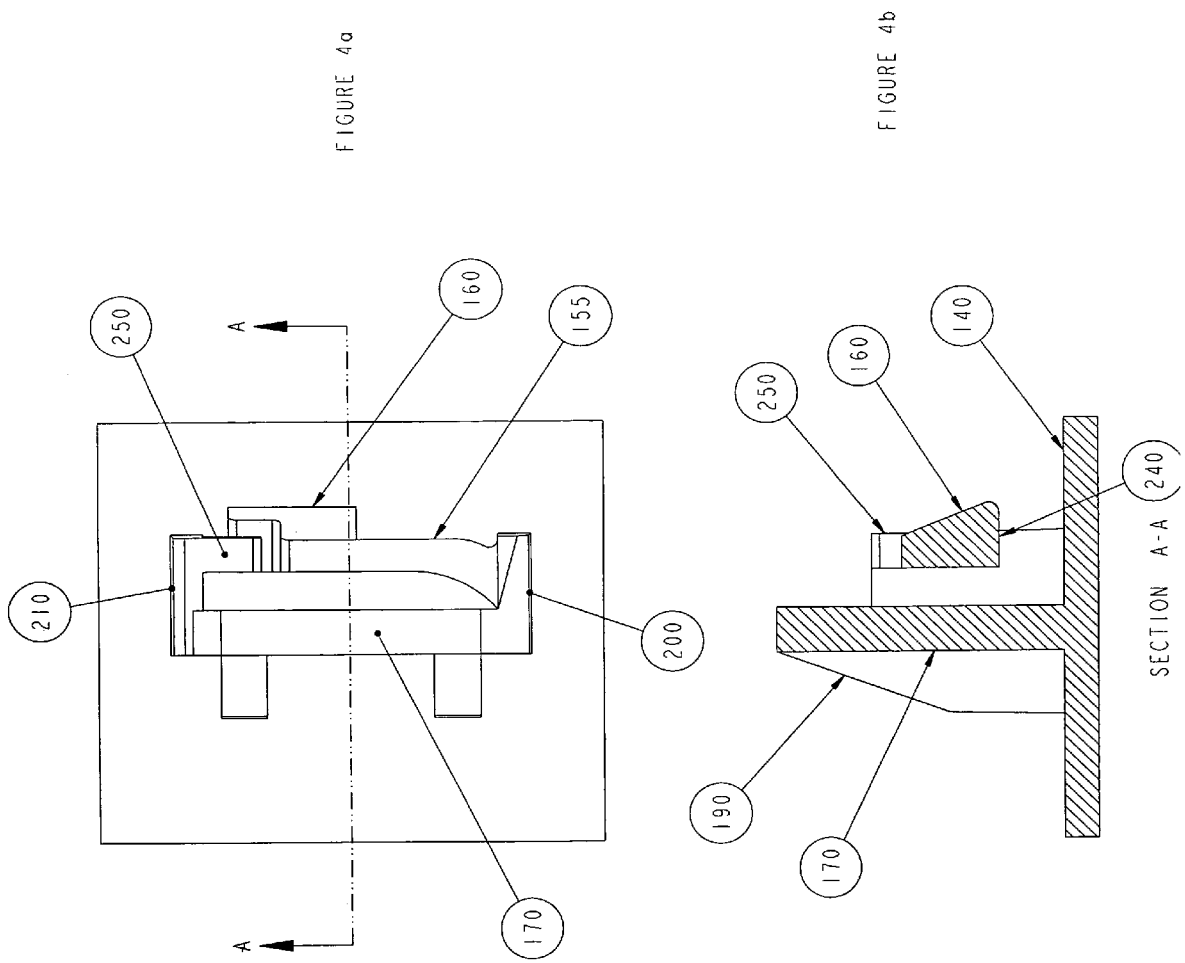

SECTION A-A

SECTION A-A

ELECTRICAL COMPONENT SIDE ACTION FASTENERS FOR A LOAD CENTER BASEPAN

BACKGROUND

A load center is an enclosure used in electrical systems of all types for both conventional homes and commercial buildings for holding overcurrent devices or circuit breakers. A load center is the central point of distribution and overcurrent protection of an electrical system which includes panel, breaker panel, breaker box, and main panel. For safety and convenience purposes, all overcurrent devices that protect structure wiring should be in a central location. Loads such as lights, electric motors, and appliances which consume electricity are the energy consuming devices in any electrical system. All of the wiring supplying the electrical loads in a building come together at individual breakers in the load center. The number of overcurrent devices in a load center is dictated by the total electrical consumption of the building and the type of load. A single breaker may protect many electrical receptacles.

An electric load center also generally consists of an insulated basepan on which several bus bars, neutral bars, neutral tie bars and other electrical components have been secured. Traditionally, electrical components have been secured to the basepan of a load center by using secondary hardware or common fastening devices such as screws and bolts. This can be cumbersome, time consuming to apply, uneconomical, require extra parts, and most importantly can impart stresses to the component being secured and adversely effect the structural integrity of the component. Similarly, heat staking or the plastic deformation of posts in a plastic basepan has also been employed to secure busbars to a basepan. The heat staking process requires a large amount of energy and time during the assembly process to achieve the desired amount of deformation. Similarly, the heat staking process imparts stresses which concentrate at the face of the basepan where the base of the post intersects the basepan to form corners. Such stress can significantly impair the integrity of the connection by causing a fracture of the post, loss of the integrity of the connection, and a decrease in the service life of the basepan and the load center. A need has therefore developed for an improved fastening device that will secure electrical components to a basepan.

Also, prior art attachment methods between the neutral bar and the basepan are unsatisfactory. There is a need for simplified assembly, mounting and securing of the neutral bar to the basepan. This is accomplished by providing a configuration of the neutral bar for which the neutral bar is attached by means of applying a downward vertical force to fix the neutral bar to the supporting basepan and does not require the use of screws or heat staking thereby reducing the number of components in the load center and facilitating the mounting of the neutral bar to the basepan.

SUMMARY OF INVENTION

In accordance with the invention, a load center comprising: an enclosure, a basepan mounted with the enclosure for distributing a load to a circuit breaker, a basepan first surface for securing electrical components with a fastener assembly wherein the fastener assembly comprising a self aligning support post and an arm with engaging lock affixed thereto for securing the at least one electrical component to the basepan first surface.

In accordance with another aspect of this invention, a basepan for securing electrical components in a load center comprising: a basepan first surface wherein at least one electrical component is secured after mounting; a fastener assembly comprising a self aligning support post and arm with engaging lock affixed thereto for securing the at least one electrical component to the basepan first surface.

In accordance with another aspect of this invention, a method to secure an electrical component to a basepan, the method comprising: mounting the electrical component to the basepan; providing a fastening assembly comprising a self aligning support post and arm with engaging lock affixed thereto for securing the electrical component to the basepan first surface; and securing the electrical component with the fastening assembly.

In accordance with an aspect of the present invention, a load center comprising: an enclosure, a basepan mounted with the enclosure for distributing a load to a circuit breaker, a basepan first surface for securing electrical components with a fastener assembly wherein the fastener assembly comprising an angled arm and a swing snap for securing the at least one electrical component to a basepan first surface.

It is an object of the invention to secure electrical components to an insulated surface or basepan first surface without the use of secondary hardware or equipment such as heat staking equipment, push nut insertion equipment or a mechanical press.

It is an object of the invention to reduce the amount of force required to assemble electrical components to the insulated surface or basepan first surface of a load center.

BRIEF DESCRIPTION OF DRAWINGS

FIG. 4a shows an elevational view of the fastener for the present invention.

FIG. 4b shows a cross sectional A-A view of the fastener for the present invention.

DETAILED DESCRIPTION

Figure 1:
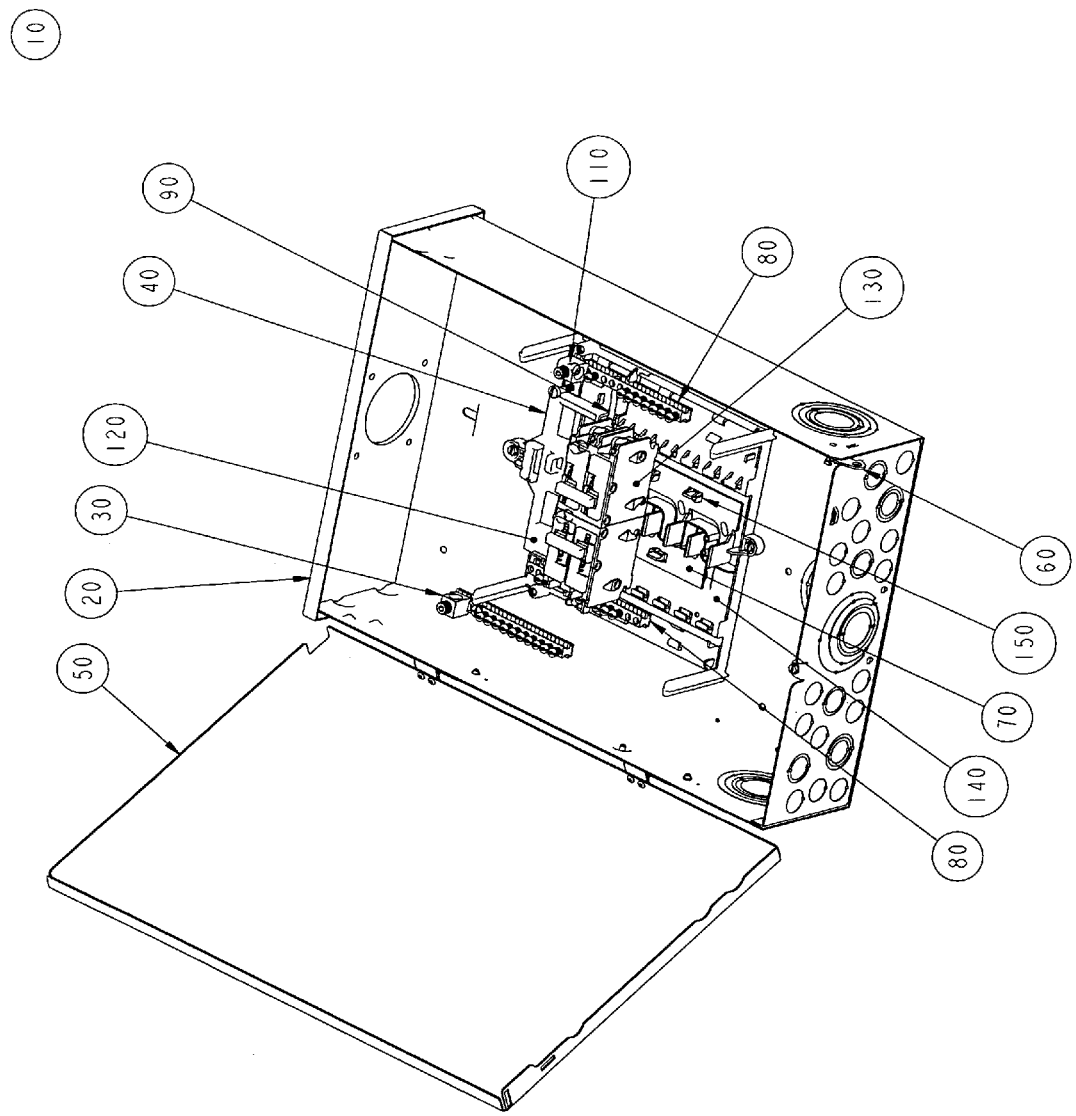
FIG. 1 shows an electrical fastener in a basepan in a load center.
Figure 2:
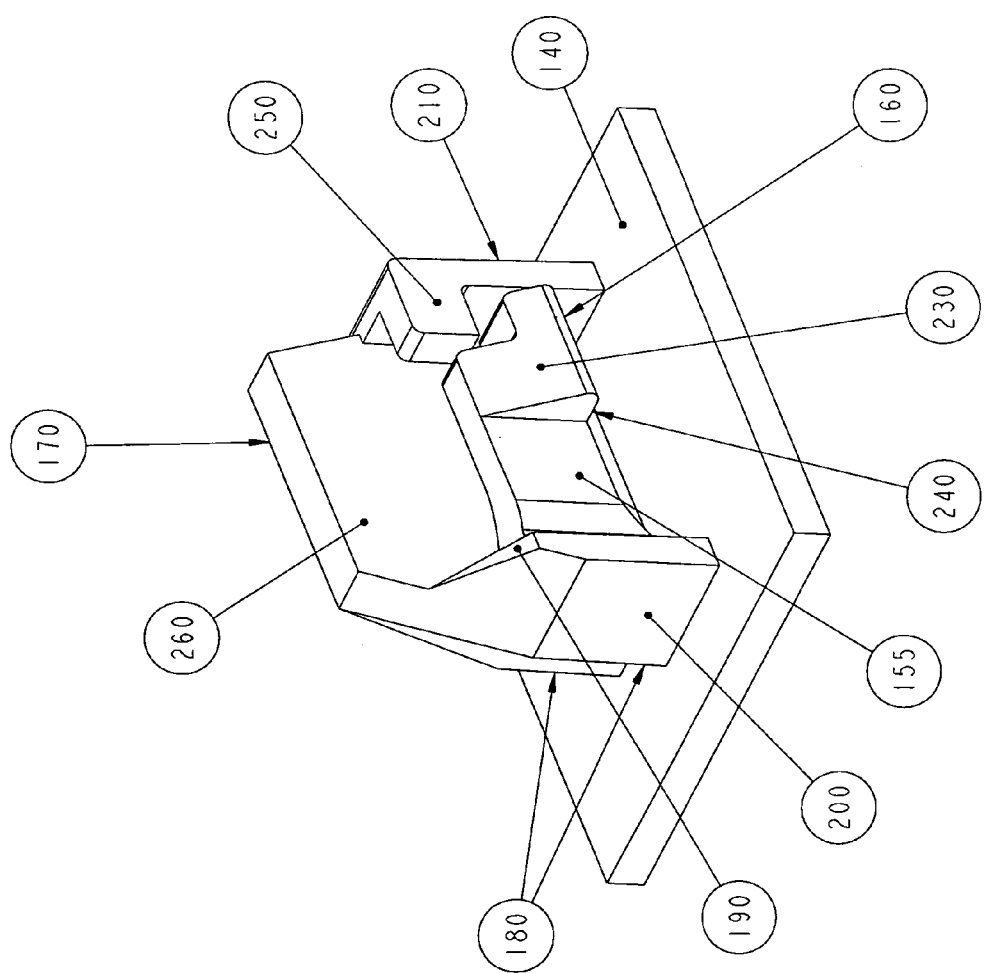
FIG. 2 shows a perspective view of the fastener for the present invention.
Figure 3:
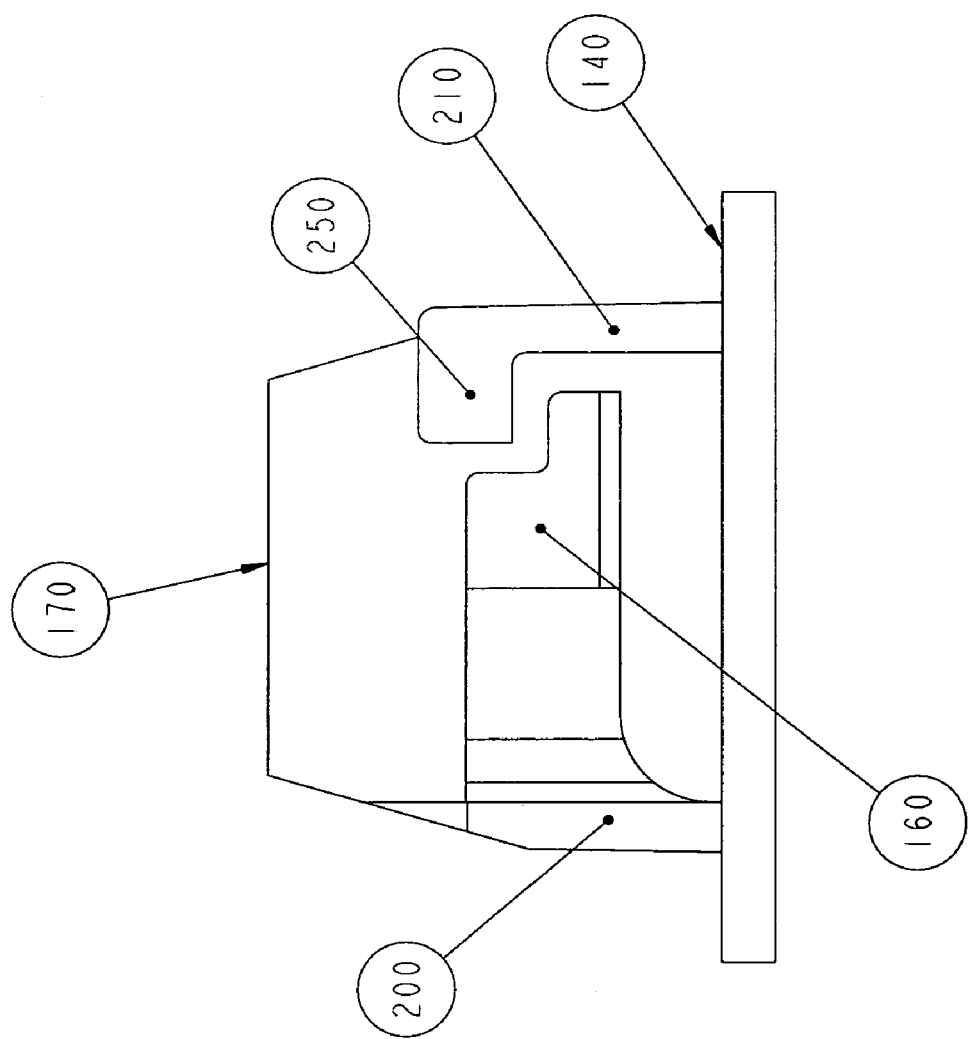
FIG. 3 shows a frontal view of the fastener for the present invention.

Referring to FIG. 1, the load center 10 includes an enclosure 20, ground lug 30, supporting basepan 40 mounted there in, door 50, door latch 60, bus bars 70, neutral bars 80, neutral tie bar 90, the main lugs (not shown), and neutral lug 110, main lug insulator 120 and distribution circuit breakers 130. In the present invention, the bus bar 70 dimensions will be specified by customer requirements prior to load center 10 assembly.

The basepan 40 includes a first surface 140 upon which an electrical component such as a bus bar 70 can be mounted to distribute electric power from an incoming utility power line to a plurality of individual circuits through circuit breakers 130. The bus bar 70 is secured to the basepan 40 by a fastening assembly 150.

Referring to FIGS. 2-4b, the fastening assembly 150 utilizes two main structures comprising an arm 155 with at least one engaging lock 160 affixed thereto and a self aligning support post 170. The self aligning support post 170 projects perpendicularly from the basepan first surface 140 and consists of a multifaceted surfaces 180 that function to prevent lateral motion of any electrical components being secured to the basepan first surface 140 of the load center 10. The self aligning support post 170 also contains a plurality of angled surface sides 190 that facilitates the vertical assembly of load center 10 and prevents any lateral motion of an electrical component being secured to the basepan 40. The self aligning support post 170 includes at least two side extending walls 200, 210 that create an interior cavity 220 which houses the arm 155. The arm 155 is affixed to at least one of the two side extending walls 200, 210 by molding. The arm 155 includes an engaging lock 160 affixed to its front dorsal surface that functions to overhang the bus bar 70 and vertically constrain bus bar 70. The arm 155 is generally rectangular in shape and does not contact the electrical component being secured to the basepan first surface 140. Others skilled in the art may select an alternate shape for the arm 155 including, round, square, oblong, or cylindrical. Similarly the engaging lock 160 consists of a first surface 230 inclined towards the basepan 40 at a non-zero angle. The engaging lock 160 also consists of a second surface 240 having a zero angle with respect to the basepan 40. The distance of engaging lock 160 from basepan first surface 140 will be predetermined based on several factors including the material thickness of the bus bar 70 and current process capability of producing the bus bar 70. In the preferred embodiment, the point where the first surface 230 and the second surface 240 of the engaging lock 160 intersect is rounded to reduce high stresses that manifest during bus bar insertion.

The fastener assembly 150 is constructed of thermo plastic and operates by applying a downward force that is perpendicular to the basepan first surface 140 until the self aligning support post 170 engages and prevents the bus bar 70 from moving. Those skilled in the art may use a polyphenylene oxide dyrene (ppo) grade of Noryl SE1X or ASAHI 540V to construct the fastener assembly 150. The self aligning support post 170 is a self aligning structure with at least one angled side that facilitates vertical assembly and mounting of the bus bar 70 to the basepan first surface 140. The plurality of outwardly angled surfaces sides 190 are configured to locate the bus bar 70 or other electrical component with respect to the basepan 40. An extension stopper 250 located generally on the upper portion of the side extending wall 210. The extension stopper 250 prevents excessive strain levels from occurring to the arm 155 when an upward force is applied to the bus bar 70.

Once the electronic component comes into contact with the engaging lock 160, the arm 155 will flex toward the back wall 260 of the self aligning support post 170 to allow the electronic component to fall under the engaging lock 160. The distance between the engaging lock second surface 240 and the basepan first surface 140 will be dictated and predetermined by the thickness of the electronic component being mounted. Similarly, the distance between the engaging lock second surface 240 and the bus bar 70 will be a varying optimized gap that may approach zero.

The engaging lock 160 prevents vertical movement of the busbar that also projects away from the basepan first surface 140. The bottom surface of the engaging lock 160 is aligned with the bottom surface of the arm 155. The arm 155 and self aligning support post 170 are in close proximity however do not contact each other.

The fastener assembly 150 works by applying a downward force that is perpendicular to the basepan first surface 140 until the self aligning support post 170 engages and prevents the bus bar 70 from moving. The self aligning support post 170 pre-positions the bus bar 70 just before a downward force is applied by a press or manual assembly. The support post 170 is sized so that there will be interference between the bus bar 70 and the self aligning support post 170. This will eliminate lateral movement of the bus bar 70 once assembly has been completed. A downward force perpendicular to the basepan first surface 140 will trigger movement to the engaging lock 160. The engaging lock 160 and arm 155 will initially move away from the middle plane perpendicular to the basepan first surface 140 and then return back to its initial position. As a result, the engaging lock 160 will not be in a pre-loaded state in order to hold the bus bar 70 in place (in a direction perpendicular to the basepan first surface 140). The engaging lock 160 will only be under load if a force opposite the downward force is applied to the bus bar 70. However, the engaging lock 160 will prevent the bus bar 70 from disengaging. The amount of force required to release the bus bar 70 will be dependent on the type of material selected. Preferably, a material achieving no less than a 35 lb pull out force to disengage the bus bar 70 is used.

Figure 5A:
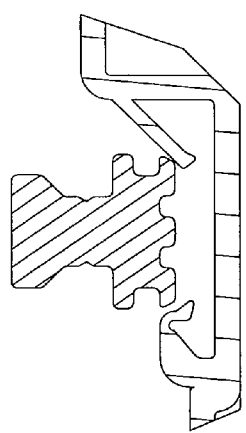
FIG. 5a shows a cross sectional A-A view of the neutral bar being installed onto a basepan in a load center.
Figure 5B:
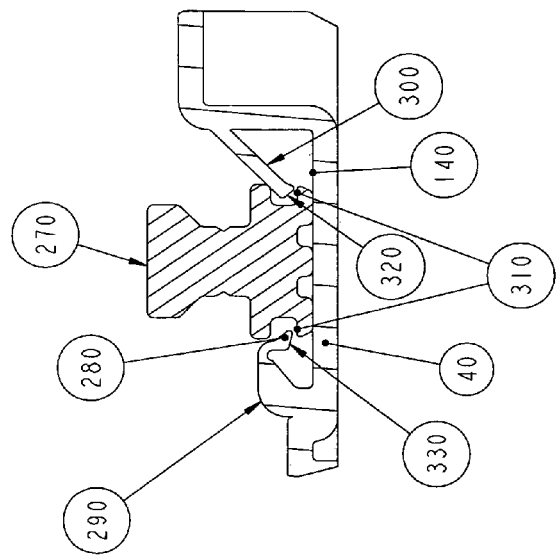
FIG. 5b shows a cross sectional view of the fastener with the neutral bar.

Referring to FIGS. 5a and 5b, installation of the neutral bar 270 within the basepan 40 is accomplished by applying a downward vertical force (F) to the neutral bar 270 thereby engaging neutral bar 270 with swing snap 280 of wall 290 and an angled arm 300 until neural bar extension 310 positions and locks itself under both the swing snap 280 and angled arm 300. The first surface 320 of angled arm 300 and the first surface 330 of swing snap 280 have a non zero angle with respect to the first surface of basepan 140. Swing snap 280 and angled arm 300 will interfere with any vertical motion of neutral bar 270 and will function to secure neutral bar 270 to basepan 40.

While the foregoing description and drawings represent the preferred embodiments of the present invention, it will be apparent to those skilled in the art that various changes and modifications may be made therein without departing from the true spirit and scope of the present invention.

The invention claimed is:

1. A load center comprising: an enclosure, a basepan mounted with the enclosure for distributing a load to a circuit breaker, a basepan first surface for securing electrical components with a top down fastener assembly wherein the top down fastener assembly comprising a self aligning support post and an arm with engaging lock affixed thereto for securing the at least one electrical component to the basepan first surface.

2. The load center according to claim 1, wherein the self aligning support post includes a plurality of non zero angled faces to facilitate assembly of the electrical components.

3. The load center according to claim 1, wherein the self aligning support post includes an interior cavity to house the arm.

4. The load center according to claim 1, wherein the arm is shaped as a rectangular, square, or cylinder.

5. The load center according to claim 1, wherein the engaging lock is affixed to the arm by molding.

6. The load center according to claim 1, wherein the engaging lock comprises at least a first and a second surface.

7. The engaging lock according to claim 6, wherein the first surface is inclined at a non-zero angle with respect to the first surface of the basepan.

8. The engaging lock according to claim 6, wherein the second surface is angled at zero degrees with respect to the first surface of the basepan.

9. The engaging lock according to claim 6, wherein the first surface intersects the second surface as a rounded tip.

10. The load center according to claim 1, wherein a bottom surface of the engaging lock is aligned with a bottom surface of the arm.

11. A basepan for securing electrical components in a load center comprising:
   a basepan first surface wherein at least one electrical component is secured after mounting;
   a top down fastener assembly comprising a self aligning support post and arm with engaging lock affixed thereto for securing the at least one electrical component to the basepan first surface.

12. The basepan according to claim 11, wherein the self aligning support post includes a plurality of non zero angled faces to facilitate assembly of the electrical component.

13. The basepan according to claim 11, wherein the self aligning support post includes an interior cavity to house the arm.

14. The basepan according to claim 11, wherein the engaging lock affixed to the arm by molding.

15. The basepan according to claim 11, wherein the engaging lock comprises at least a first and second surface.

16. The engaging lock according to claim 15, wherein the first surface is inclined at a non-zero angle with respect to the basepan first surface.

17. The engaging lock according to clalm 15, wherein the second surface is angled at zero degrees with respect to the basepan first surface.

18. A method to secure an electrical component to a basepan, the method comprising:
   mounting the electrical component to the basepan;
   providing a top down fastening assembly comprising a self aligning support post and arm with engaging lock affixed thereto for securing the electrical component to the basepan first surface; and
   securing the electrical component with the top down fastening assembly.

19. The method of claim 18, wherein the self aligning support post includes a plurality of non zero angled faces to facilitate assembly of the electrical components.

20. The method of claim 18, wherein the self aligning support post includes an interior cavity to house the arm.

21. The method of clalm 18, wherein the arm is shaped as a rectangular, square, or cylinder.

22. The method of claim 18, wherein the engaging lock is affixed to the arm by molding.

23. The method of claim 18, wherein the engaging lock comprises at least a first and a second surface both inclined at a non zero angle with respect to the first surface of the basepan.

24. A load center comprising: an enclosure, a basepan mounted with the enclosure for distributing a load to a circuit breaker, a basepan first surface for securing a neutral bar with a top down fastener assembly wherein the top down fastener assembly comprising an angled arm and a swing snap for securing the at least one electrical component to a basepan first surface.

25. The load center according to claim 24, wherein the angled arm is shaped as a rectangle, square, or cylinder.

26. The load center according to claim 24, wherein the swing snap is affixed to a wall.

27. The load center according to claim 24, wherein a first surface of the angled arm is inclined at a non-zero angle with respect to the first surface of the basepan.

28. The load center according to claim 24, wherein the first surface of the swing snap is inclined at a non-zero degree angle with respect to the first surface of the basepan.

* * * * *